United States Patent [19]

Shimizu

[11] Patent Number: 5,046,410
[45] Date of Patent: Sep. 10, 1991

[54] SELF CLEANING LIQUID CIRCULATOR

[75] Inventor: Yasuhiro Shimizu, Isehara, Japan

[73] Assignee: Toshin Technical Co., Ltd., Kanagawa, Japan

[21] Appl. No.: 595,328

[22] Filed: Oct. 10, 1990

Related U.S. Application Data

[62] Division of Ser. No. 329,237, Mar. 27, 1989, Pat. No. 4,989,668.

[30] Foreign Application Priority Data

Dec. 12, 1988 [JP] Japan ................... 63-313501

[51] Int. Cl.⁵ .................. A23B 5/00; A23C 23/00
[52] U.S. Cl. ...................... 99/455; 99/453; 99/470; 99/483; 137/266; 137/334
[58] Field of Search ............. 99/453–455, 99/452, 470, 483, 496–500; 137/266, 265, 263, 334, 340; 366/138; 165/47, 97, 158–160, 134.1; 426/521, 522, 330.1

[56] References Cited

U.S. PATENT DOCUMENTS

| 1,379,875 | 5/1921 | Mulertz | 426/521 |
| 2,490,759 | 12/1949 | Tyden | 165/97 |
| 3,820,598 | 6/1974 | Fenger et al. | 165/60 |
| 4,203,906 | 5/1980 | Takada et al. | 165/159 |
| 4,233,891 | 11/1980 | Schindler et al. | 99/470 |
| 4,367,785 | 1/1983 | Allen | 137/334 |
| 4,476,867 | 10/1984 | Parks | 165/30 |
| 4,534,282 | 8/1985 | Marinoza | 99/453 |
| 4,642,149 | 2/1987 | Harper | 165/916 |
| 4,646,784 | 3/1987 | deLeeuwe | 137/266 |
| 4,724,754 | 2/1988 | Crozat et al. | 99/483 |

Primary Examiner—Timothy F. Simone
Attorney, Agent, or Firm—Guy W. Shoup; Norman R. Klivans

[57] ABSTRACT

A liquid heating or cooling circulator in which a liquid such as liquid egg is heated and cooled and flows easily and which is easily cleaned. The circulator includes a casing which holds a number of vertically disposed pipes held between upper and lower holding plates. The interior surface of the pipes is an aluminum alloy for corrosion resistance. A circulating pump and valves circulate the liquid egg or other liquid through the pipes in the casing.

3 Claims, 4 Drawing Sheets

FIG.5
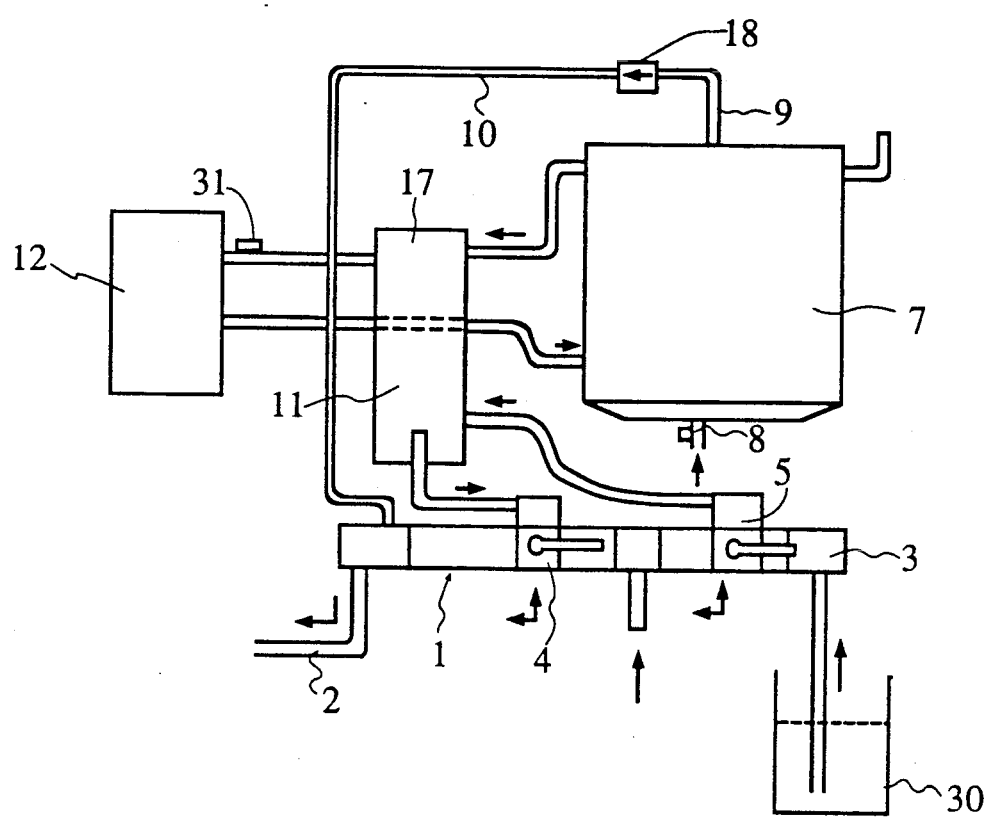
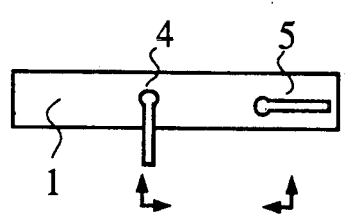
FIG.6A
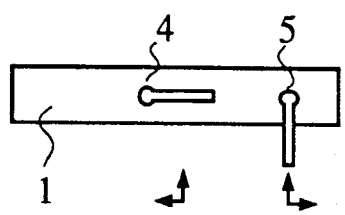
FIG.6B

SELF CLEANING LIQUID CIRCULATOR

This application is a divison of application Serial No. 07/329,237, filed 3/27/89, U.S. Pat. No. 4,989,668.

BACKGROUND OF THE INVENTION

1. Field of the Invention

This invention relates to a liquid heating or cooling circulator and more particularly to a liquid heating and cooling circulator in which a liquid such as liquid egg is heated and cooled and easily feeded and easily cleaned.

2. Related Art

As the conventionally employed liquid heating or cooling circulator, there are so far proposed a variety of constructions, as typified by the construction such as disclosed in Japanese Utility Model Publication 30-781 and 33-17286.

Said publication 30-781 discloses a plate type having many through holes, and said publication 33-17286 discloses a pipe type having many pipes which are disposed laterally.

In the above described liquid heating or cooling circulator, the following problems were presented.

In case of construction of publication 30-781, a stoppage of liquid for said through holes of said plate is frequently caused.

In case of construction of publication 33-17286, a stoppage of liquid for said pipes of lateral type is frequently caused, and a cleaning there of is very difficult since these pipes are disposed in lateral condition.

OBJECT AND SUMMARY OF THE INVENTION

In view of these drawbacks of the prior art device, it is a principal object of the present invention to provide a liquid heating and cooling circulator in which a liquid such as liquid egg is heated or cooled and easily fed and easily cleaned.

The liquid heating or cooling circulator according to the present invention comprises a casing of a cylindrical shape, a plurality of pipes which are vertically disposed in said casing according to the axis of said casing, an upper holding plate and lower holding plate for holding an upper portion and lower portion of said pipes, an upper guide case which is detachably mounted on said upper holding plate and has an upper port, a lower guide case which is detachably mounted on said lower holding plate and has a lower port, and a heating or cooling means which is connected to said casing for heating or cooling an inside of where said casing, said pipes are used in a vertical condition. When the liquid being circulated is liquid egg, it is an object of the invention to provide a corrosion resisting material, preferably an aluminum alloy, to the pipe surfaces which are in contact with the circulated liquid.

In the liquid heating or cooling circulator of the present invention, it is possible to smoothly circulate a liquid in vertical pipes without a stoppage of liquid.

It is possible to efficiently feed a liquid egg just before gel condition by heating said liquid egg in said casing.

Further, it is possible to perform a circulation, feeding and expelling of liquid by operating a pair of valves in a same direction without misoperation.

BRIEF DESCRIPTION OF THE DRAWINGS

FIG. 5 shows a whole construction in which the valves are operated condition.
FIGS. 6 A and B show a partial front view for showing other operation of the valves.

EMBODIMENT OF THE INVENTION

Figure 1:
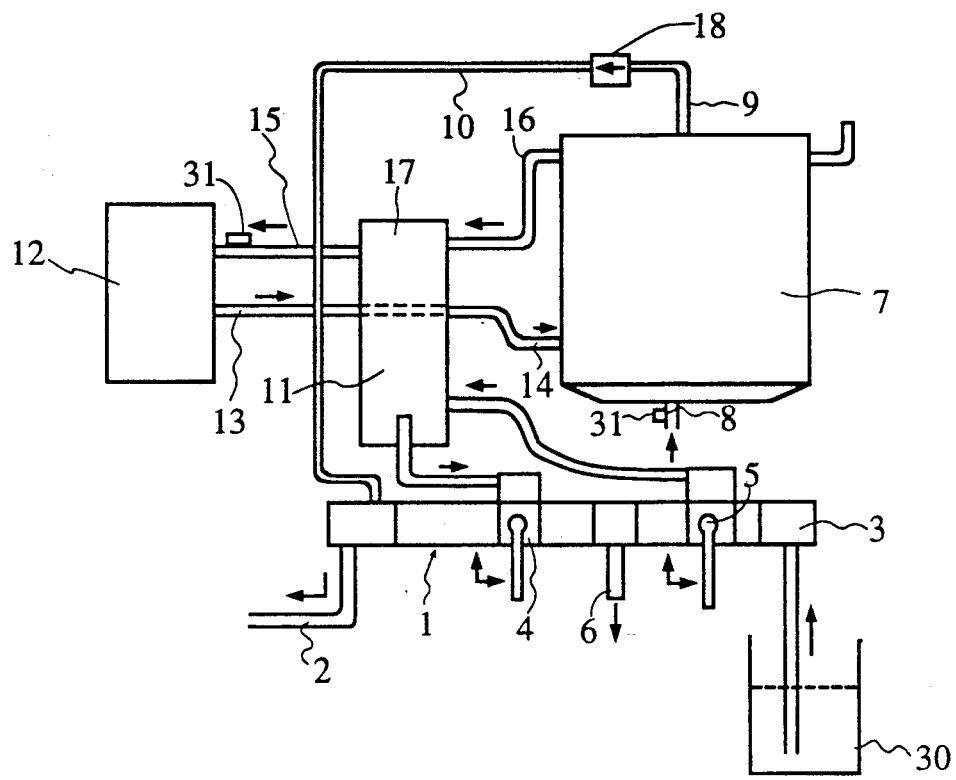
FIG. 1 shows a whole construction.
Figure 2:
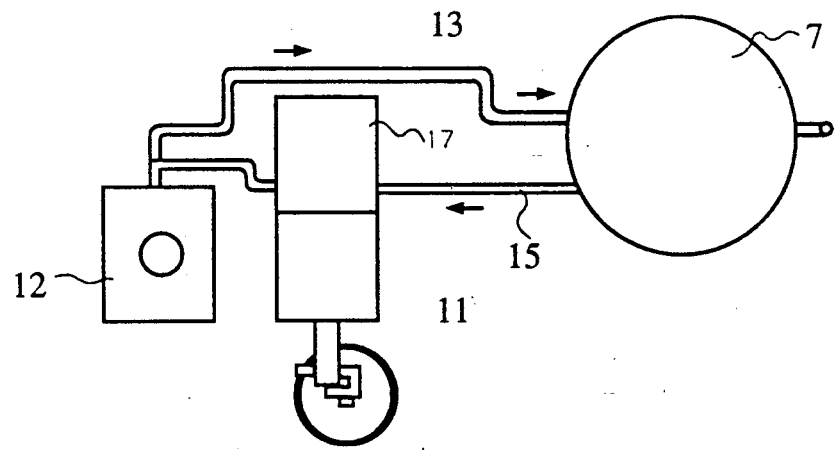
FIG. 2 shows a top view of FIG. 1.
Figure 3:
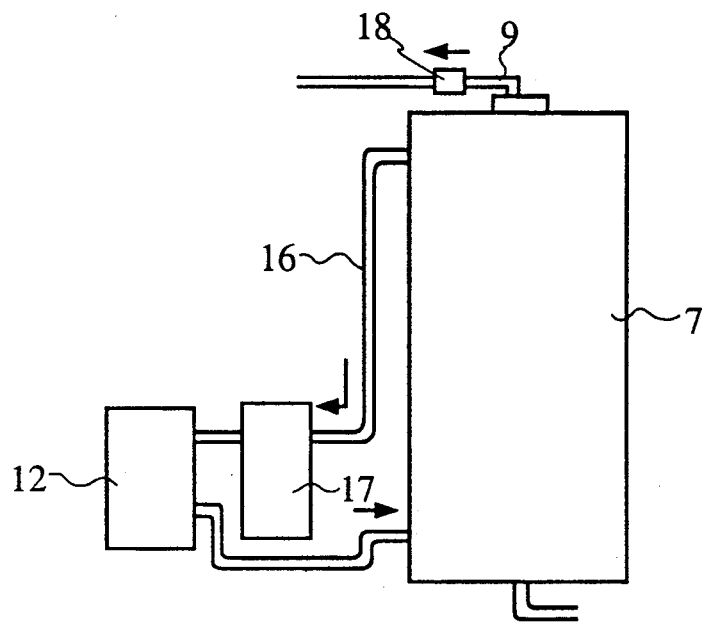
FIG. 3 shows a partial side view of FIG. 1,
FIGS. 4, A and B show a top view and front view of FIG. 1.
Figures 4A, 4B:
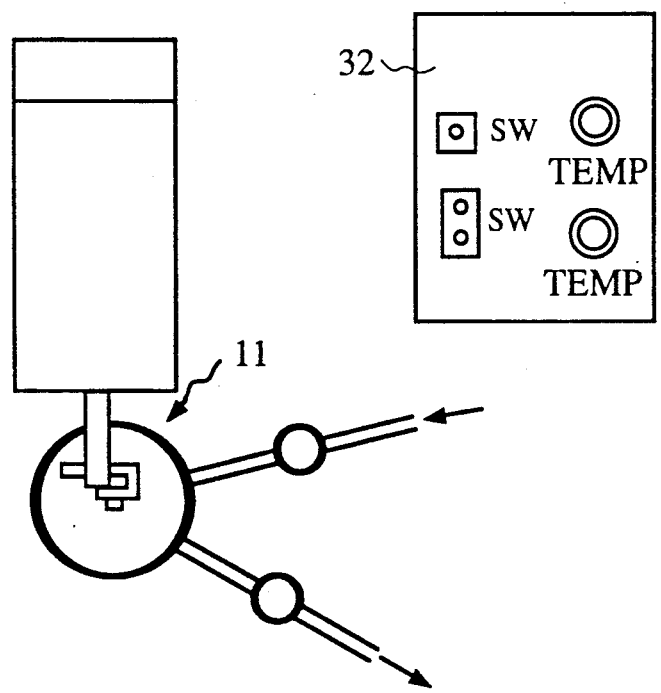

A preferred embodiment of the liquid heating or cooling circulator of the present invention will be hereafter explained by referring to the accompanying drawings.

Numeral 1 is a tube member, an outlet port 2 is mounted to one end of said tube member 1, an inlet port 3 is mounted to an other end thereof.

A first valve 4 and second valve 5 are mounted to a central portion of said tube member 1, said valves 4 and 5 are opened according to the arrow marks.

A feeding port 6 between said valves 4 and 5 is connected to a supplying port 8 of a tank 7 and, a drain port 9 which is positioned on said tank 7 is connected to said outlet port 2 through a drain pipe 10.

Said valves 4 and 5 are connected to a pump 11 which feeds a liquid material along the arrow mark.

Numeral 12 is a boiler, an outlet port 13 is connected to an inlet port 14 of said tank 7, an outlet port 15 is connected to an outlet port 16 of said tank 7, a circulating pump 17 is disposed between said outlet port 16 and inlet port 15 an hot water which is heated by said boiler 12 is circulated in said tank 7.

A one-way valve 18 in which a liquid only flows along the arrow mark is unconnected to said drain pipe 10.

Figure 7:
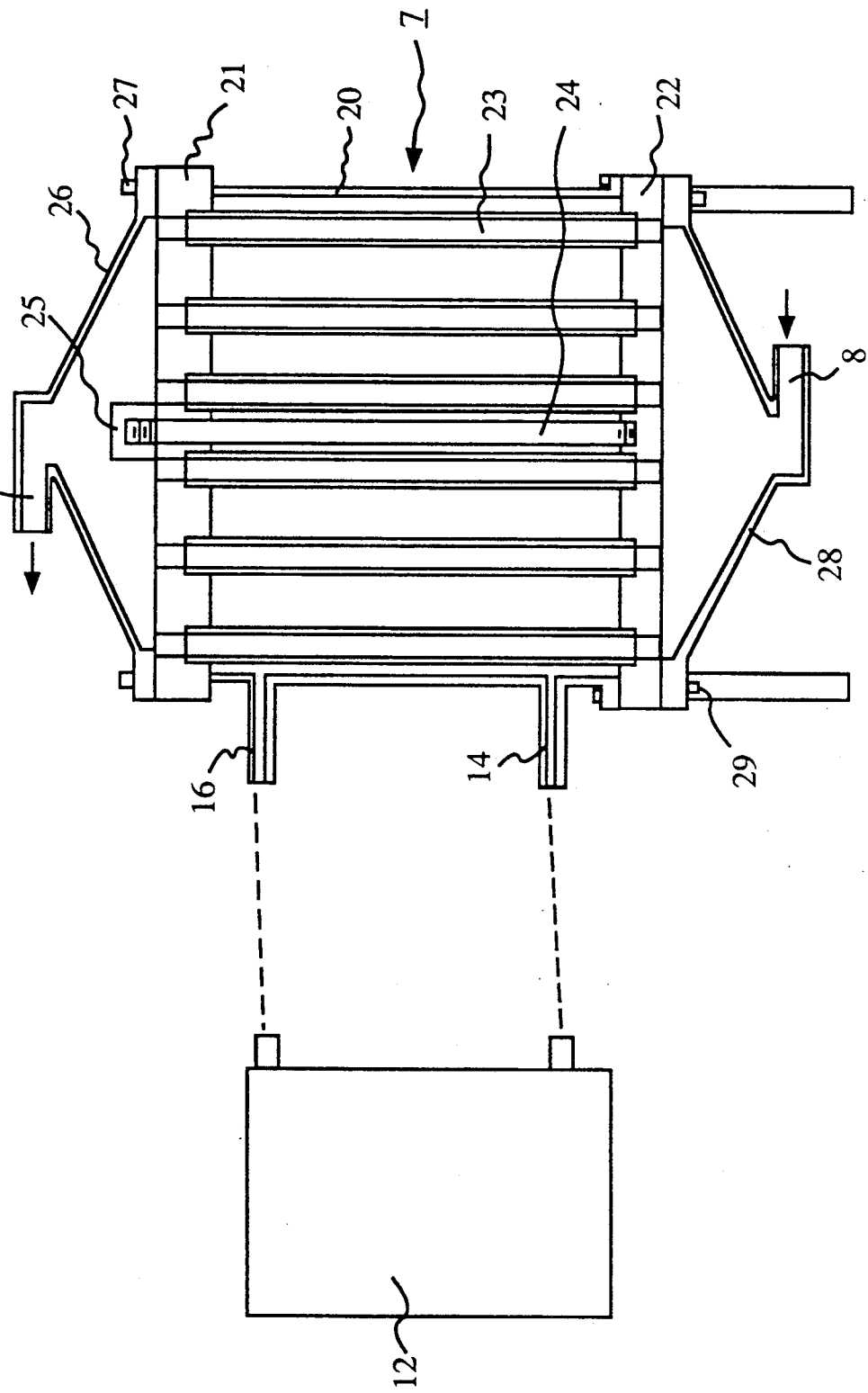
FIG. 7 shows a side cross view of a tank.

Said tank is constructed such as shown in FIG. 7 and is constructed by a casing 20 which has said inlet port 14 and outlet port 16, and an upper holding plate 21 and lower holding plate 22 are mounted to an upper portion and lower portion of said casing 20.

A plurality of pipes 23 are vertically disposed between said upper holding plate 21 and lower holding plate 22 which are detachably mounted by a screw bar 24 and nut member 25.

As upper guide casing 26 having a drain port 9 is mounted on said upper holding plate 21 by a nut member 27 and a lower guide casing 28 having a supplying port 8 is mounted under said lower holding plate 22. When the liquid being circulated is liquid egg, a corrosion resisting material, such as aluminum alloy, is provided on the surfaces of the pipe which are in contact with the liquid egg.

Referring now to an operation of the liquid heating or cooling circulator of the present invention:

In a condition of FIG. 1, a liquid material such as liquid egg from a material tank 30 is fed to said outlet port 2 via said inlet port 3, second valve 5, pump 11, first valve 4, feeding port 6, supplying port 8, pipes 23, drain port 9 and pipe 10.

Further, in case of operating said valves 4 and 5 shown in FIG. 5, a liquid material in said tank 7 is compulsorily expelled from said supplying port 8 via said second valve 5, pump 11, first valve 4 and outlet port 2, whereby a cleaning of an inside of said tank 7 is easily performed. In said cleaning process, hot water which is heated in said boiler 12 is fed into said inside of said casing 20 in said tank 7, whereby said pipes 23 are heated. Further, when said valves 4 and 5 are controlled such as A and B of FIG. 6, a circulation in said tank 7 and a circulation to said material tank 30 is performed.

What we claimed is:

1. A liquid circulator for circulating liquid through a casing having a drain port and a supply port comprising:
   a one-way valve connected at a first end to the drain port for allowing liquid to flow only out of the drain port;
   a drain pipe connected to a second end of the one-way valve, and terminating in an outlet port;
   a supply tank for supplying liquid to flow through the casing and connected to an inlet port;
   a first valve having two positions and a body and connected at a first end to the inlet port;
   a feed port connected to a second end of the first valve and to the supply port;
   a second valve having two positions and a body and connected at a first end to the feed port and connected at a second end to the outlet port; and
   a pump connected between the body of the first valve and the body of the second valve;
   wherein the first and second valves both being in a first position, liquid circulates from the supply tank via the inlet port through the first valve, to the pump, to the second valve, to the feed port to the supply port, through the casing, and out through the drain port, to the one way valve, to the drain pipe, to the outlet port; and
   wherein the first and second valves both being in a second position, liquid in the casing circulates out of the casing via the supply port, to the feed port, to the first valve, to the pump, to the second valve, and to the outlet port.

2. The device of claim 1, wherein the liquid is liquid egg and further comprising a plurality of pipes held inside said casing for carrying the liquid egg through the casing and wherein an interior surface of each of said pipes comprises a material corrosion resistant to liquid egg.

3. The device of claim 2, wherein the corrosion resistant material is an aluminum alloy.

* * * * *